(12) United States Patent
Weinberger et al.

(10) Patent No.: US 11,967,737 B2
(45) Date of Patent: Apr. 23, 2024

(54) BUSBAR FOR A BATTERY MODULE AND BATTERY MODULE

(71) Applicant: SAMSUNG SDI CO., LTD., Yongin-si (KR)

(72) Inventors: Martin Weinberger, Maria Saal (AT); Martin Kraker, Graz (AT); Matic Blaznik, Tomsiceva ul (SL); Jörg Killmann, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 74 days.

(21) Appl. No.: 16/664,705

(22) Filed: Oct. 25, 2019

(65) Prior Publication Data

US 2020/0136119 A1 Apr. 30, 2020

(30) Foreign Application Priority Data

Oct. 26, 2018 (EP) .................................. 18202785
Oct. 24, 2019 (KR) ........................ 10-2019-0133007

(51) Int. Cl.
*H01M 50/507* (2021.01)
*H01M 50/503* (2021.01)
*H01M 50/512* (2021.01)

(52) U.S. Cl.
CPC ....... *H01M 50/507* (2021.01); *H01M 50/503* (2021.01); *H01M 50/512* (2021.01)

(58) Field of Classification Search
CPC .................................................. H01M 50/502
See application file for complete search history.

(56) References Cited

U.S. PATENT DOCUMENTS

| | | | | |
|---|---|---|---|---|
| 8,257,855 | B2 * | 9/2012 | Ijaz | H01H 85/044 429/120 |
| 9,853,277 | B2 * | 12/2017 | Benedict | H01M 50/20 |
| 9,991,645 | B2 | 6/2018 | Fritz et al. | |

(Continued)

FOREIGN PATENT DOCUMENTS

| CN | 101983443 A | 3/2011 |
|---|---|---|
| CN | 102195022 A | 9/2011 |

(Continued)

OTHER PUBLICATIONS

Extended European Search Report issued in EP18202785.4 dated Mar. 19, 2019, 9 pages.

(Continued)

*Primary Examiner* — Maria Laios
*Assistant Examiner* — Jordan E Berresford
(74) *Attorney, Agent, or Firm* — Lewis Roca Rothgerber Christie LLP (57) ABSTRACT

A busbar for a battery module is provided. The battery module includes a plurality of aligned battery cells, and the busbar includes: a busbar body portion extending in an extension direction and a plurality of legs extending from the busbar body portion in a direction non-parallel to the extension direction of the busbar body portion. The busbar body portion have a length to connect cell terminals of a plurality of the battery cells of the battery module, and the legs are configured to electrically connect the busbar body portion and the cell terminals of the battery cells of the battery module to each other.

16 Claims, 5 Drawing Sheets

(56) References Cited

U.S. PATENT DOCUMENTS

| | | | |
|---|---|---|---|
| 2009/0053591 A1* | 2/2009 | Ikeda | H01M 50/209 |
| | | | 429/99 |
| 2011/0076546 A1 | 3/2011 | Choi et al. | |
| 2011/0223776 A1 | 9/2011 | Ferber, Jr. | |
| 2014/0008781 A1 | 1/2014 | Nishi et al. | |
| 2015/0207127 A1* | 7/2015 | Davis | H01M 50/209 |
| | | | 429/90 |
| 2015/0221915 A1 | 8/2015 | Burkman et al. | |
| 2016/0181579 A1 | 6/2016 | Geshi et al. | |
| 2016/0372733 A1 | 12/2016 | Benedict et al. | |
| 2017/0012269 A1* | 1/2017 | Grzywok | H01M 10/482 |
| 2017/0125770 A1 | 5/2017 | Kim et al. | |
| 2017/0256770 A1* | 9/2017 | Wynn | H01M 50/213 |
| 2017/0288198 A1 | 10/2017 | Schmiedhofer | |
| 2018/0097322 A1 | 4/2018 | Harris, III | |
| 2020/0091487 A1 | 3/2020 | Zeng et al. | |
| 2021/0074966 A1 | 3/2021 | Shan et al. | |

FOREIGN PATENT DOCUMENTS

| | | |
|---|---|---|
| CN | 104821383 A | 8/2015 |
| CN | 105474434 A | 4/2016 |
| CN | 106104847 A | 11/2016 |
| CN | 106257773 A | 12/2016 |
| CN | 106558670 A | 4/2017 |
| CN | 106654138 A | 5/2017 |
| CN | 107275555 A | 10/2017 |
| CN | 208444901 U | 1/2019 |
| DE | 10 2009 000 675 A1 | 8/2010 |
| EP | 2989676 B1 | 3/2017 |
| EP | 3 624 220 A1 | 3/2020 |
| JP | 2010-205509 A | 9/2010 |
| JP | 2012-243689 A | 12/2012 |
| JP | 5618157 B2 | 11/2014 |
| KR | 10-2017-0052324 A | 5/2017 |
| WO | WO 2013-080136 A1 | 6/2013 |
| WO | WO 2015-144542 A1 | 10/2015 |

OTHER PUBLICATIONS

European Office action issued in corresponding application No. EP 18202785.4, dated Apr. 19, 2021, 6 pages.

Chinese Office action issued in corresponding application No. CN 201911023156.0, dated Dec. 13, 2021, 21 pages.

EP Office action issued in corresponding application No. EP 18 202 785.4, dated Sep. 9, 2021, 4 pages.

Chinese Office action issued in corresponding application No. CN 201911023156.0, dated Jun. 24, 2022, 17 pages.

Chinese Office action issued in application No. CN 201911023156.0, dated Oct. 10, 2022, 15 pages.

European Office action issued in corresponding application No. EP 18 202 785.4, dated Aug. 18, 2023, 5 pages.

Chinese Office Action issued in corresponding Patent Application No. CN201911023156.0, dated Dec. 13, 2023, 15 pages (with English Translation).

\* cited by examiner

RELATED ART

BUSBAR FOR A BATTERY MODULE AND BATTERY MODULE

CROSS-REFERENCE TO RELATED APPLICATIONS

This application claims priority to and the benefit of European Patent Application No. 18202785.4, filed in the European Patent Office on Oct. 26, 2018, and Korean Patent Application No. 10-2019-0133007, filed in the Korean Intellectual Property Office on Oct. 24, 2019, the entire content of both which are incorporated herein by reference.

BACKGROUND

1. Field

Aspects of embodiments of the present invention relate to a busbar for a battery module and to a battery module including the busbar.

2. Related Art

A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for electric or hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction between the positive electrode, the negative electrode, and the electrolyte solution. The shape of the case, for example, cylindrical or rectangular, may be selected according to the battery's intended purpose.

Rechargeable batteries may be used as a battery module formed of a plurality of unit battery cells coupled to each other in series and/or in parallel to provide relatively high energy density for, as an example, driving a motor of a hybrid vehicle. The battery module may be formed by interconnecting the electrode terminals of the plurality of unit battery cells to each other, the number of unit battery cells depending on a desired amount of power, to realize a high-power rechargeable battery for, as an example, an electric vehicle.

Battery modules can be constructed according to a block design or a modular design. In block designs, each battery cell is coupled to a common current collector structure and a common battery management system. In modular designs, pluralities of battery cells are connected to each other to form submodules, and several submodules are connected to each other to form the battery module. Battery management functions may be realized either on a module or a submodule level, and thus, interchangeability of the components is improved with the module design. The battery modules may be mechanically and electrically integrated, equipped with a thermal management system, and configured to communicate with one or more electric consumers to form a battery system.

To provide electrical integration of a battery system according to the modular design, submodules with a plurality of cells connected to each other in parallel may be connected in series (XpYs) or submodules with a plurality of cells connected to each other in series may be connected in parallel (XsYp). XpYs-type submodules can generate high voltages, and in XsYp-type submodules, the capacitance of the cells add up, and thus, XsYp-type submodules are generally used with low capacitance cells.

To electrically interconnect the battery cells and/or battery submodules of a battery module, the battery module usually includes a plurality of busbars. The busbars may be configured to be connected to the battery module terminals to supply external loads with current provided by the battery module. The design of the busbars may be driven, at least in part, on the design of the interconnected battery cells and, in the case of interconnected battery submodules, on the specific XsYp- or XpYs-configuration of the battery module.

Manifold designs for such busbars are known from the prior art, some of which take into account further aspects, such as the integration of shunt resistors in the busbars or cell swelling compensation during the operation of the battery module. However, common busbars according to the prior art are often simple bar-shaped aluminum strips allowing solely for more simple battery module configurations or have a complex three-dimensional shape that significantly contributes to the overall height of the battery module.

SUMMARY

One or more of the drawbacks of the related art can be avoided or at least mitigated according to embodiments of the present invention, which provide a busbar for a battery module that reduces mechanical stress within a battery module while having a compact size.

In one embodiment, a busbar for a battery module is provided. The battery module includes a plurality of battery cells that are aligned in a lengthwise direction of the battery module. With respect to the battery cells and their alignment within the battery module, the battery module may be configured similar to a related art battery module. The busbar according to embodiments of the present invention includes a busbar body portion extending in an extension direction thereof, for example, in (or along) the lengthwise direction of the battery module. The busbar body portion may have a length in the extension direction to connect (e.g., sufficient to connect) cell terminals of a plurality of (e.g., two or more) of the battery cells of the battery module. In some embodiments, the busbar body portion of the busbar is planar, and in some embodiments, the busbar body portion is entirely (or fully) planar.

In some embodiments, the length of the busbar body portion is at least two times, and, in some embodiments, at least three times, the length of a battery cell of the battery module in the lengthwise direction of the battery module. However, the length of the busbar body portion may also be, for example, six times ($2_p X_s$), nine times ($3_p X_s$), or twelve times ($4_p X_s$) the length of a battery cell of the battery module in the lengthwise direction of the battery module. The latter is useful for double-layered busbar setups as described in more detail below.

The busbar according to embodiments of the present invention further includes a plurality of legs (e.g., two or more cell contact legs), which extend from the busbar body portion in a direction that is non-parallel to the extension direction of the busbar body portion (e.g., non-parallel to a lengthwise direction of the battery module). In some embodiments, each leg encloses an angle between 0° and 180°, such as between 45° and 135°, with respect to the extension direction of the busbar body portion. In one embodiment, each leg extends from the busbar body portion in a direction perpendicular to (or substantially perpendicular to) the extension direction of the busbar body portion, for example, perpendicular to the lengthwise direction of the battery module. The legs may be parallel (or substantially parallel) to each other. Further, each leg may be configured to electrically connect the busbar body portion and at least one cell terminal of a battery cell of the battery module. For example, the busbar includes a number of legs equal to or less than the number of battery cells interconnected by the busbar, and each leg connects at least one cell terminal to the busbar body portion. Thus, when the busbar is configured to electrically connect two battery cells to each other, a first cell contact leg may extend perpendicularly from the busbar body portion, for example, from a first end thereof, to connect a cell terminal of a first cell, and a second cell contact leg may extend perpendicularly from the busbar body portion, for example, from a second end thereof, to connect a cell terminal of a second cell. However, each of these legs may also be connected to a plurality of terminals, respectively, or each cell terminal may be connected to the busbar via a separate (e.g., by a single) leg.

The busbar, according to embodiments of the present invention, has a design in which the busbar body portion, i.e., the portion of the busbar that is primarily responsive for carrying an electric current, may be at least partially disposed next to the cell terminal, at least in part because the cell contact legs extend from a busbar body portion in a direction non-parallel to the busbar extension direction. Because the cell terminals protrude upwardly from the battery cell case, there is space next to the battery cell terminals that is normally unused by related art busbars, which are mounted on top of the battery cell terminals. The busbar body portion of the busbar according to embodiments of the present invention may be disposed within this space next to the battery cell terminals by contacting the cell terminals from the side thereof via respective legs or by using bent legs to contact the cell terminals from above, while positioning the busbar body portion next to the cell terminals. Thus, the busbar according to embodiments of the present invention allows for a battery module with a relatively small height.

Further, because the cell contacting legs extend from the busbar body portion in a direction non-parallel to the extension direction thereof, they are relatively flexibly and improve the overall plasticity (e.g., deformability) to the busbar. For example, the cell contacting legs can pivot to a certain extent around a connection portion to the busbar body portion. Any deformation of the busbar, particularly of the cell contact legs relatively to the busbar body portion, may be either elastic or plastic deformation. Hence, the flexibility of the busbar is increased compared to related art bar-shaped busbars. Thus, the busbar according to embodiments of the present invention may compensate for dimensional changes of the battery module due to, for example, cell swelling, and may compensate for relative movement between the battery cells of the battery module. By damping mechanical loads due to the bending of the cell contact legs at where they connect to the busbar body portion, the probability the busbar cracking or the like is decreased and stability of the battery module is improved. For example, the busbar according to embodiment of the present invention may be deformed in response to any displacement of the cell terminals to which it is connected to without reaching maximum strain, that is, without breaking. Further, the busbar according to embodiments of the present invention reduces the maximum load acting on the cell terminals.

In one embodiment of the present invention, the busbar body portion has a first body section (e.g., a first peripheral body section) and a second body section (e.g., a second peripheral body section). The first body section and the second body section are spaced apart from each other in the extension direction of the busbar body portion, for example, in the lengthwise direction of the battery module, and the first and second body sections are spaced apart from each other by a third body section (e.g., a third central body section) of the busbar body portion. That is, the third body section may be disposed between the first body section and the second body section. Hence, the busbar, according to this embodiment, has three primary parts, and the peripheral body sections are connected to the battery cell terminals while the central body section transports the current.

In some embodiments, at least one cell contact leg of the cell contact legs extends from the first peripheral body section, and at least one other cell contact leg of the cell contact legs extends from the second peripheral body section. For example, at least one cell contact leg extends from each of the first and second body sections. In some embodiments, a first plurality (e.g., a first group) of cell contact legs extends from the first body section, and a second plurality (e.g., a second group) of cell contact legs extends from the second body section, and number of legs in the first plurality of legs may be equal to the number of legs in the second plurality of legs. Further, the first body section and the second body section may have the same (or substantially the same) length in the extension direction of the busbar body portion, for example, in the lengthwise direction of the battery module. The first, second, and third body sections may have the same (or substantially the same) length in the extension direction of the busbar body portion, for example, in the lengthwise direction of the battery module.

Further, the length of the first body section may correspond to the spatial extension (e.g., the length of or overall distance of) of the respective cell terminals connected to the first body section via respective cell contact legs. The said length and spatial extension refer to the extension direction of the busbar body portion, for example, the lengthwise direction of the battery module. For example, when two cell terminals are connected to the first body section via one or two cell contact legs, the length of the first body section may correspond to the spatial extension of the two battery cell terminals and may correspond to the spatial extension (e.g., the length) of the two battery cells (e.g., the two battery cell cases). When two cell terminals are connected to the second body section via one or two cell contact legs, the length of the second body section may correspond to the spatial extension of the two battery cell terminals, for example, to the spatial extension (e.g., the length) of the two battery cells (e.g., the two battery cell cases). Further, the length of the third body section may correspond to the spatial extension of two battery cell terminals, for example, to the spatial extension (e.g., length) of two battery cells (e.g., two battery cell cases), in the lengthwise direction of the battery module. When the length of the third body section is equal to (or substantially equal to) the length of the first and second body sections, a double layer busbar configuration may be provided as further explained below.

In one embodiment, a plurality of cell contact legs extend from the first peripheral body section, and a plurality of cell contact legs extend from the second peripheral body section. Hence, a plurality of cell terminals are connected to each of these peripheral body sections. Within each body section, the cell contact legs are separated (e.g., spaced apart) from each other in the extension direction of the busbar body portion, for example, the lengthwise direction of the battery module. For example, the cell contact legs extending from the first peripheral body section are spaced apart from each other, and the cell contact legs extending from the second peripheral body section are spaced apart from each other. Naturally, the cell contact legs of the first and second peripheral body portion are also spaced apart from each other. By separating the cell contact legs and by contacting each cell terminal with a single cell contact leg, the plasticity of the busbar is further increased.

The cell contact legs that extend from the first peripheral body section may be separated from each other by at least one first cutout. Further, the cell contact legs that extend from the second peripheral body section may be separated by at least one second cutout. For example, a cutout is disposed between each two adjacent cell contact legs within each body section. The material in the region of such cutout may be after casting a monolithic busbar blank. The cutouts (e.g., the first and second cutouts) may extend into the respective peripheral body section. Therein, each cutout may be oriented (e.g., may extend) in parallel to the cell contact legs in between the cell contact legs and may change direction within the respective peripheral body section. For example, an end of such a cutout not disposed between the cell contact legs may extend in an extension direction of the busbar body portion. With these cutouts, the plasticity of the busbar is further increased. By extending the cutouts into the peripheral body sections, such as with an changing extension direction of the cutout within the respective body section, the mechanical properties of the busbar may be variously changed and selected. Further, additional cutouts may be arranged within the cell contact legs, for example, one or more cutouts may be provided within each of the legs and/or within the third central body section.

In one embodiment, the height of the busbar (e.g., the height of the busbar body portion of the busbar) is substantially smaller than the width and the length of the busbar. The length of the busbar may refer to (e.g., may correspond to or may be measured in) an extension direction of the busbar, and the width of the busbar may refer to (e.g., may correspond to or may be measured in) a direction perpendicular to the extension direction. The height of the busbar may then refer to (e.g., may correspond to or may be measured in) a direction perpendicular to the length direction and the width direction of the busbar. In some embodiments, the height of the busbar (e.g., the height of the busbar body portion) is smaller than the height of the cell terminals to which the busbar (e.g., the peripheral busbar body sections) is connected via respective cell contact legs. Throughout this disclosure, the height of the cell terminals refers to the extension of the cell terminals above a cap plate of a corresponding battery cell case, for example, along the busbar's height direction. Accordingly, a particularly compact battery module may be provided.

Another embodiment of the present invention relates to a battery module. The battery module includes a plurality of battery cells that are aligned in a lengthwise direction (e.g., a lengthwise direction of the battery module). In the battery module, each battery cell includes a battery case for receiving (or accommodating) an electrode assembly and a cap assembly that is placed on the battery case and closes (or seals) the battery case. Cell terminals may protrude from the cap assembly. The cap assembly may further include a vent opening. The battery module, according to embodiments of the present invention, further includes a plurality of busbars as described above and as further described below. The busbars electrically interconnect the battery cells of the battery module in a respective configuration (e.g., an $X_sY_p$ or $X_pY_s$ configuration) according to a desired use of the battery module. Each of the busbars is electrically connected to the cell terminals of a plurality of battery cells. For example, each of the busbars includes at least one cell contact leg extending from a first body section and at least one cell contact leg extending from a second body section, and the cell contact legs electrically connect the terminals and a busbar body portion that electrically interconnects the battery cells.

According to one embodiment of the present invention, at least one of the body sections (e.g., at least one of the first, second, and third body sections) of the busbar as described above extends in the lengthwise direction of the battery module and has a spatial extension (e.g., a length) that corresponds to the spatial extension (e.g., a length) of at least one battery cell in the lengthwise direction of the battery module. In other words, at least one of the body sections has a length in the lengthwise direction of the battery module that is at least (e.g., that is equal to or greater than) the length of one battery cell (e.g., of one battery cell casing) in the lengthwise direction of the battery module. In some embodiments, each of the body sections of the busbar may have a spatial extension in the lengthwise direction of the battery module that corresponds to the spatial extension of at least one battery cell in the lengthwise direction of the battery module. As described in more detail below, an extension (e.g., a length) of each body section corresponding to the extension (e.g., the length) of one battery cell allows for a $1_pY_s$ configuration. For example, when an extension of each body section of the busbar corresponds to the extension of "X" battery cells (wherein X is a natural number of 1 of greater), the busbar allows for an $X_pY_s$ configuration of the battery module.

In one embodiment, the battery module may include a first set of busbars and a second set of busbars, the busbars being as described herein. A busbar of the first set of busbars and, in some embodiments, each busbar of the first set of busbars, is shifted (or offset) with respect to a corresponding busbar of the second set of busbars in the lengthwise direction of the battery module. For each busbar of the first set of busbars, a corresponding busbar of the second set of busbars is shifted (or offset) in the lengthwise direction of the battery system by the length of one body section of the busbars, the length referring to an extension of the body section in the extension direction thereof (e.g., along the lengthwise direction of the battery module). When the body sections of the busbar each have the same (or substantially the same) length in a direction, the busbars of the first and second set of busbars are shifted along the direction by the length of any of these sections. For example, the first or second peripheral body section of a busbar of the first set of busbars may be overlaid with a third central body section of a busbar of the second set of busbars. For example, the busbars of the first set of busbars partially overlap the busbars of the second set of busbars.

According to an embodiment of the battery module, the first set of busbars electrically interconnects a first subset of the plurality of battery cells, and the second set of busbars electrically interconnects a second subset of the plurality of battery cells. In an $X_pY_s$ configuration, for example, the first set of busbars may interconnect $X_p(0.5*Y)_s$ battery cells, and the second set of busbars may interconnect $X_p(0.5*Y)_s$ battery cells. In a $X_sY_p$ configuration, for example, the first set of busbars may interconnect $(0.5*X)_sY_p$ battery cells, and the second set of busbars may interconnect $(0.5*X)_sY_p$ battery cells. Hence, embodiments of the present invention allow for a denser packaging of the battery module by partially overlaying busbars as described above. To provide proper electrical function of the battery module, the first set of busbars may be separated from the second set of busbars via at least one electrically insulating layer. For example, each busbar of the first set of busbars is electrically isolated from each of the busbars of the second set of busbars by distance and/or by an insulating layer between the busbars, particularly between the partially overlaid busbars as described above.

The first set of busbars may be separated from the second set of busbars in a height direction of the battery module. For example, the battery module may include a first set of busbars interconnecting a first subset of the plurality of battery cells and at least one insulating layer that follows the first subset of busbars in the height direction of the battery module, (e.g., at least one insulating layer disposed above the first set of busbars). The at least one insulating layer is followed, in the height direction of the battery module, by the second set of busbars interconnecting the second subset of the plurality of battery cells (e.g., the second subset of busbars is disposed above the at least one insulating layer). Additional insulating layers may be disposed below the first set of busbars for, as an example, isolating them from the battery cell cases, and/or above the second set of busbars for, as an example, isolating them from a top cover of the battery module. According to another embodiment, at least one of these electrically insulating layers is replaced by or includes a flexible printed circuit (FPC) layer including (or embedded within) outer insulating layers. For example, a FPC with electrically passive main surfaces may be used as insulating layer. The main surfaces of the FPC may not be completely passive and may allow for the FPC to be electrically connected to the busbars and/or the cell terminals of the battery cells of the battery module. In some embodiments, the FPC may be part of a Cell Supervision Circuit (CSC) connected to at least one busbar or cell terminal of the battery module for receiving a cell voltage and/or temperature of at least one battery cell of the battery module. The FPC may be disposed between a subset of busbars, below the first subset of busbars, or above the second subset of busbars.

According to another embodiment, the battery cells of the first subset and the battery cells of the second subset are interleaved with each other. Because the busbars of the first set of busbars are shifted from (e.g., shifted with respect to or offset with respect to) the busbars of the second set of busbars as described above, a busbar of the first set spans over at least one battery cell of the second subset without contacting it, and a busbar of the second set spans over at least one battery cell of the first subset without contacting it. For example, the central body section of a busbar of the first set may be located over the cell terminals of at least one battery cell of the second subset without contacting them, and the central body section of a busbar of the second set may be located over the cell terminals of at least one battery cell of the first subset without contact them. Herein, contact particularly refers to electric contact but may also refer to mechanical contact.

Further, when the extensions (e.g., the lengths) of the busbar's body sections correspond to the extension (e.g., length) of a single battery cell, one battery cell of the first and second subset may follow each other (e.g., may be adjacent each other) in alternating fashion. When the extensions of the body sections of the busbars correspond to the extension of two battery cells, pairs of battery cells of the first and second subset may follow each other in alternating fashion. When the extensions of the busbar's body sections correspond to the extension of a plurality of battery cells, corresponding pluralities of battery cells of the first and second subset may follow each other in alternating fashion. The length of at least one but up to and included each of the body sections of the busbars may correspond to the spatial extension of battery cells connected in parallel within the battery module in the lengthwise direction of the battery module. However, the at least one battery cell of the battery module may be connected to a busbar of the first set of busbars and to a busbar of the second set of busbars to provide an electrical connection between the first and second sets of busbars. Hence, an electrical connection between a first module terminal and a second module terminal may be closed via the first set of busbars, the second set of busbars, and the battery cells of the battery module. A battery module may include further busbar elements, such as third busbar elements, which provide an electrical connection between the first set of busbars and the second subset cells and/or provide an electrical connection between the battery module terminals and the battery cells. However, other distributions of the battery cells between the first and second subset of battery cells, for example, interleaved pluralities of battery cells including different numbers of cells, are contemplated herein.

According to another embodiment of the present invention, a busbar of the first set of busbars has a busbar body portion that is configured to be placed next to a cell terminal and has, at most, the height of the corresponding cell terminal. The busbar of the first set of busbars may include at least one leg with a cell terminal contact portion that is spaced apart from the busbar body portion in a height direction thereof (e.g., in a height direction of the battery module). In some embodiments, all of the cell contact legs of the busbar of the first set of busbars include such cell terminal contact portions. Further, the busbar of the first set of busbars may include a bridging portion that connects (e.g., extends between) the busbar body portion and the (respective) cell terminal contact portion. An individual bridging portion may provided for each cell terminal contact portion, but the present invention is not limited thereto. This embodiment allows the cell terminals to be contacted from above while positioning the busbars of the first set next to the cell terminals.

Further, a busbar of the second set of busbars may have a planar shape with, at most, the height of a cell terminal. The planar shape of a busbar of the second set of busbars may correspond to the height of the cell terminals and the height of a busbar of the first set of busbars. Hence, when the busbar of the second set of busbars is disposed on the busbar(s) of the first set of busbars and next to the cell terminals, the cell contact legs of the busbar of the second set extends over the cell terminals without being bent. However, other shapes of the busbars of the second set of busbars are contemplated herein. The height of a busbar of the first set of busbars and of a busbar of the second set of busbars may be equal to half of the height of the cell terminals, respectively. Then, the height of a busbar of the second set of busbars stacked upon a busbar of the first set of busbars is aligned with (e.g., is the same or substantially the same as) the height of the cell terminals of the battery module. In such an embodiment, the busbars of the second set of busbars also include cell contact legs with a cell terminal contact portion spaced apart from the busbar body portion in a height direct therefor to contact the cell terminals and also include a bridging portion for connecting the respective cell terminal contact portions and the busbar body portion as described above. Further aspects and features of the present invention may be learned from the following description.

BRIEF DESCRIPTION OF THE DRAWINGS

Aspects and features of the present invention will become apparent to those of ordinary skill in the art by describing, in detail, exemplary embodiments thereof with reference to the attached drawings, in which.

DETAILED DESCRIPTION

Reference will now be made, in detail, to embodiments of the present invention, examples of which are illustrated in the accompanying drawings. Aspects and features of the present invention, and implementation methods thereof, will be described with reference to the accompanying drawings. In the drawings, like reference numerals denote like elements, and redundant descriptions thereof may be omitted. The present invention, however, may be embodied in various different forms and should not be construed as being limited to the embodiments illustrated herein. Rather, these embodiments are provided as examples so that this disclosure will be thorough and complete and will fully convey the aspects and features of the present invention to those skilled in the art.

Processes, elements, and techniques that are not considered necessary for those having ordinary skill in the art to have a complete understanding of the aspects and features of the present invention may not be described. In the drawings, the relative sizes of elements, layers, and regions may be exaggerated for clarity.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise. Also, the term "exemplary" is intended to refer to an example or illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

Figure 1:
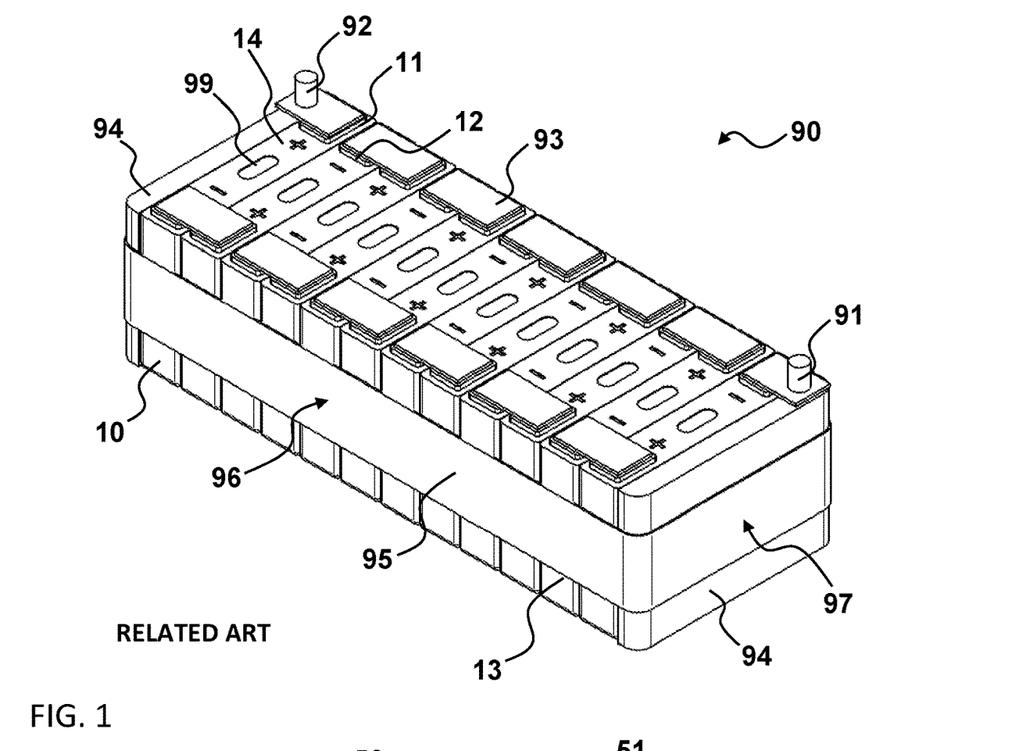
FIG. 1 is a schematic perspective view of a battery module according to the related art.

FIG. 1 illustrates a battery module 90 according to the related art including a plurality of (e.g., twelve) prismatic battery cells 10 that are connected to each other in series between a first (e.g., negative) module terminal 91 and a second (e.g., positive) module terminal 92. Here, the battery module 90 has a 12s1p configuration. Each battery cell 10 has a battery case 13 with a cap assembly 14 placed on (e.g., sealed to) the battery case 13, and a vent opening 99 is disposed in the cap assembly 14. Within the battery module 90, the battery cells 10 are stacked in a lengthwise direction with their wide, side surfaces adjacent each other such that first lateral walls of adjacent battery cells 10 face each other. As a result, the battery module 90 has a rectangular shape with a wide module side surface 96 extending in the lengthwise direction and a narrow module side surface 97 extending perpendicular thereto. One positive electrode terminal 11 and one negative electrode terminal 12 of each pair of neighboring battery cells 10 are electrically connected to each other through a busbar 93. Spacers 94 are positioned adjacent to the outward facing wide side surface of the outermost battery cells 10 and, hence, terminate the battery module 90 in the lengthwise direction. A ribbon 95 runs around (e.g., surrounds a periphery of) the battery module 90 and compresses it in the lengthwise direction.

Figure 2:
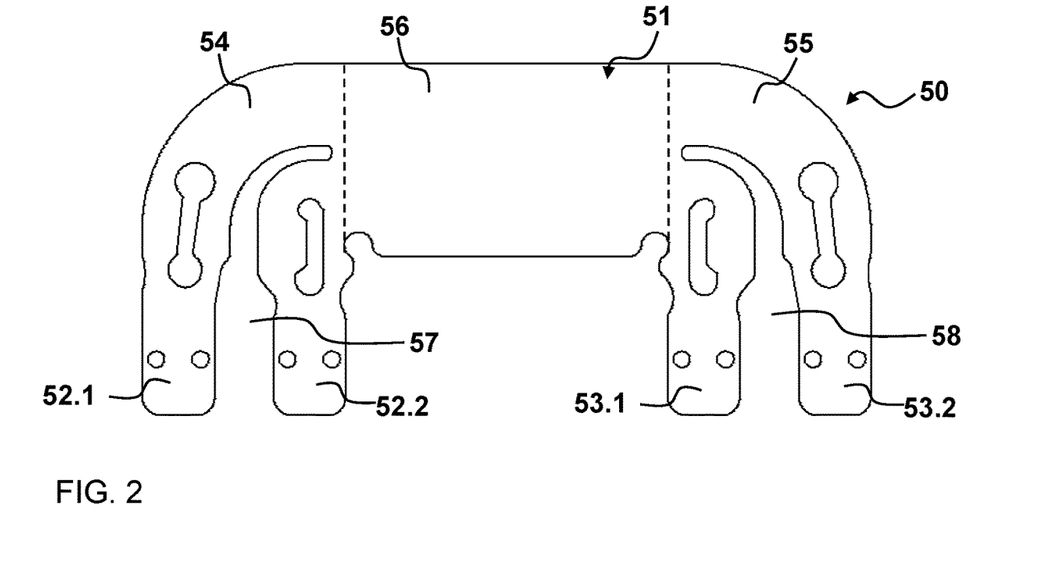
FIG. 2 is a schematic top view of a busbar according to an embodiment.

FIG. 2 is a schematic top view of a busbar (e.g., a planar busbar) 50 according to an embodiment of the present invention. The busbar 50 includes a busbar body portion (e.g., a busbar body section) 51 including (or consisting of) a first peripheral body section (e.g., a first body section) 54 and a second peripheral body section (e.g., a second body section) 55 that are separated by a central body section 56 interposed between the first and second body sections 54, 55. The central body section 56 has a rectangular shape, and upper corners of the peripheral body sections 54, 55 are rounded. The sections peripheral body sections 54, 55 are further processed as described in more detail below. The busbar body portion 51 extends in an extension direction thereof, which is the horizontal direction of FIG. 2. The busbar body portion 51 has its largest extension (e.g., its largest dimension) in the extension direction.

A plurality of (e.g., a first group of, a pair of, or two) cell contact legs 52.1, 52.2 extends from the first peripheral body section 54, and a plurality of (e.g., a second group of, a pair of, or two) cell contact legs 53.1, 53.2 extends from the second peripheral body section 55. Each of the cell contact legs 52, 53 extends in a direction perpendicular to the extension direction of the busbar body portion 51, such as in a downward vertical direction in FIG. 2. Each of the cell contact legs 52, 53 is configured to be connected to a cell terminal 11, 12 (see, e.g., FIG. 1). Thus, the busbar body portion 51 may be positioned next to the cell terminals 11, 12 in a space-saving manner (e.g., in a vertical direction or a height direction of the battery cells 10).

The cell contact legs 52.1, 52.2 extend from the first body section 54 and are separated from each other by a first cutout 57. For example, the first cutout 57 forms a void space (e.g., an opening) between the legs 52.1, 52.2 and extends between the legs 52.1, 52.2 in a direction perpendicular to the extension direction of the busbar body portion 51. The first cutout 57 extends into the first peripheral body section 54 of the busbar body portion 51. As the first cutout 57 extends into the first peripheral body section 54, it changes direction such that a terminal portion of the first cutout 57 within the first body section 54 extends parallel to the extension direction of the busbar body portion 51. Because the first cutout 57 extends into the first body section 54, the cell contact legs 52.1, 52.2 are prolonged almost to (e.g., separately extend almost to) the central body section 56 (naturally with a change of direction).

The cell contact legs 53.1, 53.2 extending from the second body section 55 are separated from each other by a second cutout 58. The second cutout 58 forms a void space (e.g., an opening) between the legs 53.1, 53.2 and extends between the legs 53.1, 53.2 in a direction perpendicular to the extension direction of the busbar body portion 51. The second cutout 58 further extends into the second peripheral body section 55 of the busbar body portion 51 and changes its direction as it extends into the second peripheral body section 55. A terminal portion of the second cutout 58 within the second body section 55 extends antiparallel to the extension direction of the busbar body portion 51. Because the second cutout 58 extends into the second body section 55, the cell contact legs 53 are prolonged almost to (e.g., separately extend almost to) the central body section 56 (naturally with a change of direction).

The first and second cutouts 57, 58 increase the plasticity (e.g., flexibility) of the busbar 50, particularly of the cell contact legs 52, 53 and particularly within the extension direction of the busbar body portion 51. The plasticity of the busbar 50 is further increased by providing bores (e.g., openings) in (e.g., at conjunctions of) the second and third cell contact leg 52.2, 53.1 and in the central body section 56 of the busbar body portion 51, respectively. Further, cutouts in the cell contact legs 52.1, 52.2 further improve the plasticity of the busbar 50.

Figure 3:
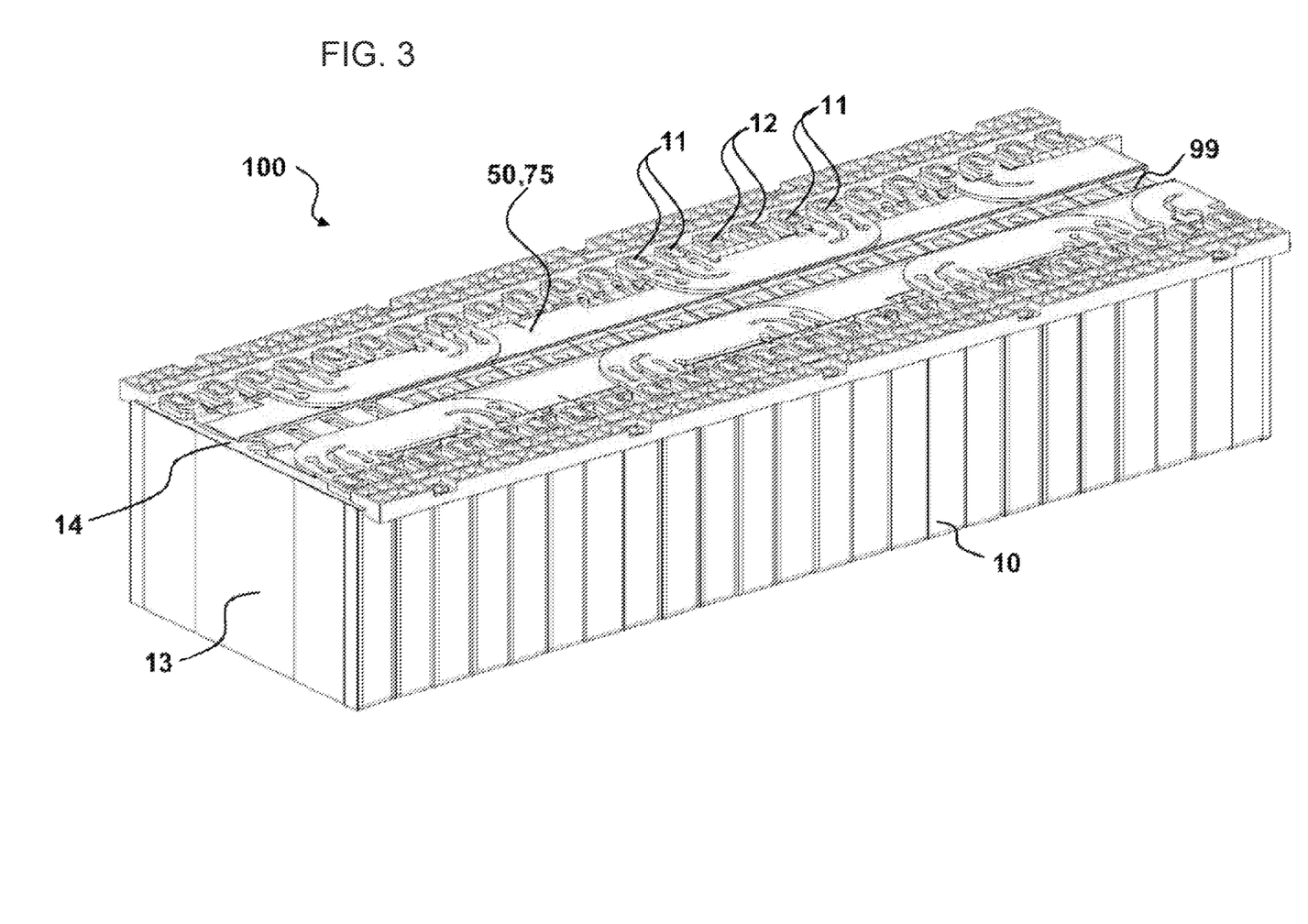
FIG. 3 is a schematic perspective view of a battery module according to an embodiment.
Figure 4:
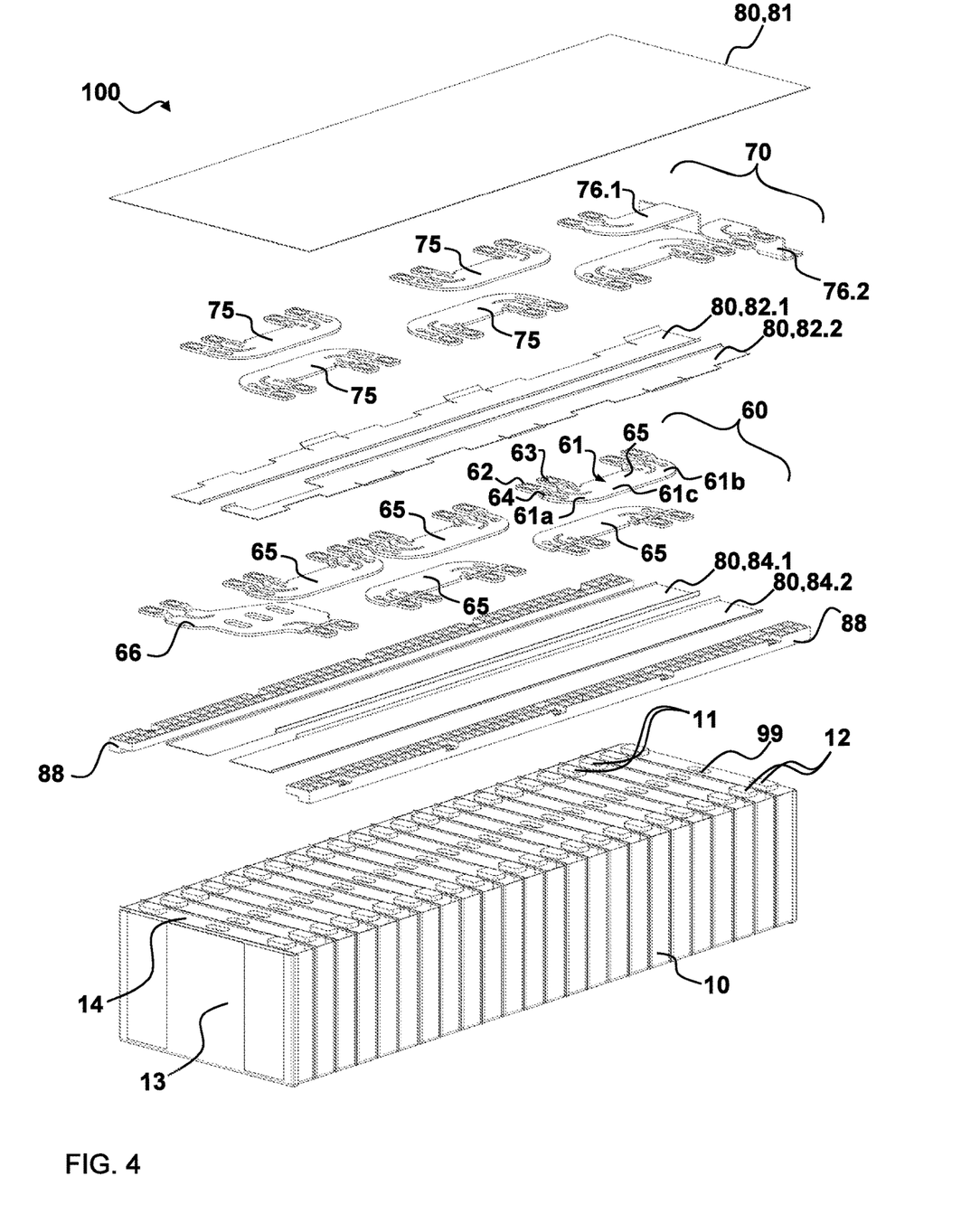
FIG. 4 is a schematic exploded perspective view of a battery module according to an embodiment.

FIGS. 3 and 4 illustrate a battery module 100 according to an embodiment. FIG. 3 is a schematic perspective view of the battery module 100, and FIG. 4 is an exploded view of the battery module 100. The battery module 100 includes a plurality of battery cells 10 that are stacked in a lengthwise direction of the battery module 100. Each of the battery cells 10 includes a battery case 13 for receiving (or accommodating) an electrode assembly that is covered (e.g., closed) by a cap assembly 14. A vent opening 99 that allows for discharging vent gases during an abnormal operation condition of the battery cell 10 is disposed in the cap assembly 14. Each battery cell 10 further includes a positive cell terminal 11 and a negative cell terminal 12. A plurality of busbars 50 (see, e.g., FIG. 2) interconnect the terminals 11, 12 of the battery cells 10 in a 2p14s configuration for the battery module 100. The detailed routing of the current path among the battery cells 10 is illustrated in more detail in FIG. 7(B).

As shown in FIG. 4, the edges (e.g., the upper edges) of the plurality of aligned battery cells 10 are covered by edge protectors 88. Further, an insulating layer 84.1 is disposed between a first terminal (e.g., a first cell terminal) 11 and the vent opening 99 of each battery cell 10, and another insulating layer 84.2 is disposed between a second terminal (e.g., a second cell terminal) 12 and the vent opening 99 of each battery cell 10. The insulating layers 84.1, 84.2 provide electric insulation between the cap assemblies 14 of the battery cells 10 and the busbars 65 of a first set of busbars 60 disposed above the insulating layers 84.1, 84.2. Each of the busbars 65 of the first set of busbars 60 has a comb-shape as shown in FIG. 4 and includes three body sections 61a, 61b, 61c forming the busbar body portion 61. Each of the body sections 61a, 61b, 61c has a spatial extension in the lengthwise direction of the battery module 100 that corresponds to the spatial extensions of the battery cases 13 of two battery cells 10 in the lengthwise direction of the battery module 100. Further, two cell contact legs 62, 63 extend from each of the peripheral body sections 61a, 61b of each of the busbars 65. Hence, each busbar 65 is configured to electrically connect the cell terminals 11, 12 of two pairs (e.g., four) of the battery cells 10, with one pair (e.g., two) battery cells 10 being disposed between the connected pairs (e.g., the four connected ones) of the battery cells 10. Thus, the busbars 65 and a third busbar 66 of the first set of busbars 60 electrically connect the battery cells 10 of a first subset 15 of the battery cells 10 of the battery module 100. A busbar of the first set of busbars 60 comprises a planar busbar body portion 61 with a height equal to or smaller than the height of the cell terminal and a leg 62 with a cell terminal contact portion 63 that is spaced apart from the busbar body portion 61 in a height direction of the battery module 100 and with a bridging portion 64 that is connecting the busbar body portion 61 and the cell terminal contact portion 63.

Above the first set of busbars 60 (e.g., above the busbars 65 of the first set of busbars 60), a plurality of (e.g., two)

further insulating layers 82.1 and 82.2 are disposed to electrically insulate the first set of busbars 60 (e.g., the busbars 65 of the first set of busbars 60) from a second set of busbars 70 (e.g., busbars 75 of the second set of busbars 70) disposed above the first set of busbars 60. The insulating layers 82.1, 82.2, as well as the insulating layers 84.1, 84.2, are disposed (e.g., are solely disposed) in the area of the busbar body portion 51 (see, e.g., FIG. 2) of the busbars 65, 75, while the cell contact legs 52, 53 (see, e.g., FIG. 2) of the busbars 65, 75 are kept free from (e.g., are exposed by) the insulating layers 82, 84. Hence, an electrical connection can be realized between the cell terminals 11, 12 and the busbars 65 of the first set of busbars 60 and between the cell terminals 11, 12 and the busbars 75 of the second set of busbars 70 while electrically insulating the busbars 65, 75 of the first and second sets of busbars 60, 70 from each other. The second set of busbars 70 further includes a second busbar 76.2 electrically connecting two outermost battery cells 10 to a negative module terminal and a third busbar 76.1 electrically connecting two adjacent battery cells 10 to a positive module terminal. To electrically insulate the second set of busbars 70 from an exterior (e.g., from an external component), an insulating top cover 81 covering the entire projected top surfaces of the battery cells 10 is disposed on the busbars 75, 76.

Figure 5:
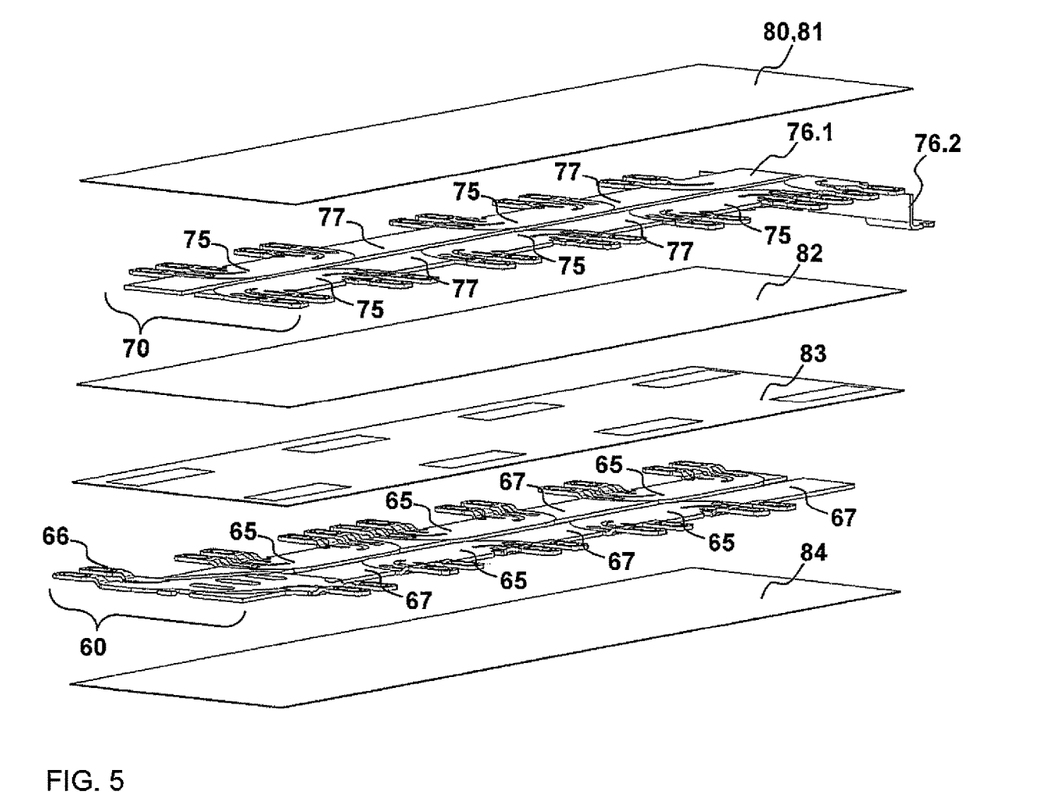
FIG. 5 is a schematic exploded perspective view the busbar of a battery module according to another embodiment.

In the battery module 100 shown in FIGS. 4 and 5, a channel is formed between the insulating layers 84.1 and 84.2, between the busbars 65 of the first set of busbars 60, between the insulating layers 82.1 and 82.2, and between the busbars 75 of the second set of busbars 70. This channel is overlaid with (e.g., overlaps) the vent openings 99 of the plurality of aligned battery cells 10, and some of the vent openings 99 are further accessible through openings in the third busbar 66 of the first set of busbars 60. Further, the top cover 81 confines (e.g., covers) the channel from above, such that it is fully enclosed by the cap assembly 14, lateral walls of the busbars 65, 75 and insulating layers 82, 84, and the top cover 81. Hence, vented gases emitted through the vent openings 99 of the battery cells 10 during an abnormal operation condition of the battery cells 10, such as during thermal runaway, may be exhausted via this channel along the lengthwise direction of the battery module 100 and outcast (or exhausted) from a side of the battery module 100. The busbar 65 of the first set of busbars 60 and the busbar 75 of the second set of busbars 70 may have the same configuration as shown in FIG. 2. The busbar 65 of the first set of busbars 60 may be shifted with respect to the busbar 75 of the second set of busbars 70 by the length of one of the central body section 56, first and second peripheral body sections 54, 55.

The portions of a battery module shown in FIG. 5 differ from the battery module 100 shown in FIGS. 3 and 4 by the structure of the busbars 50 and insulating layers 80 disposed on top of the battery cells 10. As can be seen in the exploded view of FIG. 5, an insulating layer 84 fully covers the top surfaces of the cap assemblies 14 of the battery cells 10 (see, e.g., FIG. 4) and forms the lowermost (or bottommost) layer of the busbar configuration of the battery module. A first set of busbars 60 is disposed on top of the insulating layer 84. The first set of busbars 60 includes busbars 65 and a third busbar 66 as described above and further includes inlays 67 injection molded to the busbars 65, 66. The inlays 67 fill gaps between the busbars 65, 66 and consolidate the first set of busbars 60 into a mechanically stable layer. Above the layer of the first set of busbars 60, two further insulating layers 82, 83 are disposed that have the same extension (e.g., the same dimensions) as the insulating layer 84.

Above the insulating layers 82, 83, a second set of busbars 70 is disposed that is electrically insulated from the first set of busbars 60 via the insulating layers 82, 83. Within the second set of busbars 70, busbars 75 and third busbars 76.1, 76.2 as described above are disposed. Again, inlays 77 are injection molded into gaps between the busbars 75, 76 to fill the gaps and consolidate the second set of busbars 70 into a mechanically stable layer. An insulating top cover 81 as described above with respect to FIG. 4 is disposed on top of the second set of busbars 70. Hence, in the battery module shown in FIG. 5, no channel for disposing vent gases is formed by the insulating layers 80 and the busbars 60, 70, but instead, a battery module having improved mechanical stability, particularly in an upper (cover) region thereof, is provided.

Figure 6:
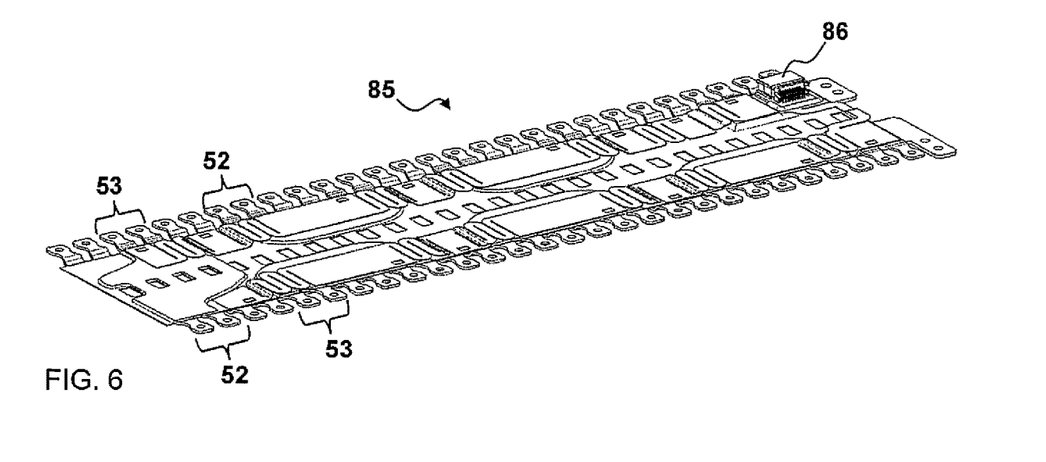
FIG. 6 is a schematic perspective view of a flexible printed circuit according to an embodiment.

As illustrated in FIG. 6, the insulating layers 81, 82, 83, 84 and the first and second set of busbars 60, 70 may form a flexible printed circuit (FPC) 85 when overlaid on each other. Therein, the outer insulating layers 81, 84 may encapsulate the remaining layers 60, 70, 82, 83 by forming an outer insulating shell around the remaining layers 60, 70, 82, 83. Therein, the cell contact legs of the busbars 65, 66, 75, 76 protrude laterally from the FPC 85 to contact the cell terminals 11, 12 of the battery cells 10 of a battery module. Further, the inner insulating layers 82, 83 may include metallizations or circuit components, such as a Cell Supervision Circuit (CSC) or parts thereof. Such circuit components may be configured to detect and/or process cell temperatures and/or voltages and may include surface metallizations that are configured to be electrically connected to the busbars. These metallizations may be further configured to connect to an integrated circuit (IC) 86, which may be configured to receive signals corresponding to cell voltages and/or temperatures, to process these signals, and/or to communicate with other components as connector. The main electric components of the FPC 85 may be provided above the second set of busbars 70 (e.g., the busbars 75, 76), below the first set of busbars 60 (e.g., the busbars 65, 66), or between the first and second sets of busbars 60 and 70. In another example, at least one of the insulating layers 81, 82, 83, 84 is replaced or comprises a flexible printed circuit, FPC, layer enclosed by outer insulating layers. In other words, a FPC with electrically passive main surfaces may be used as insulating layer.

Figure 7A:
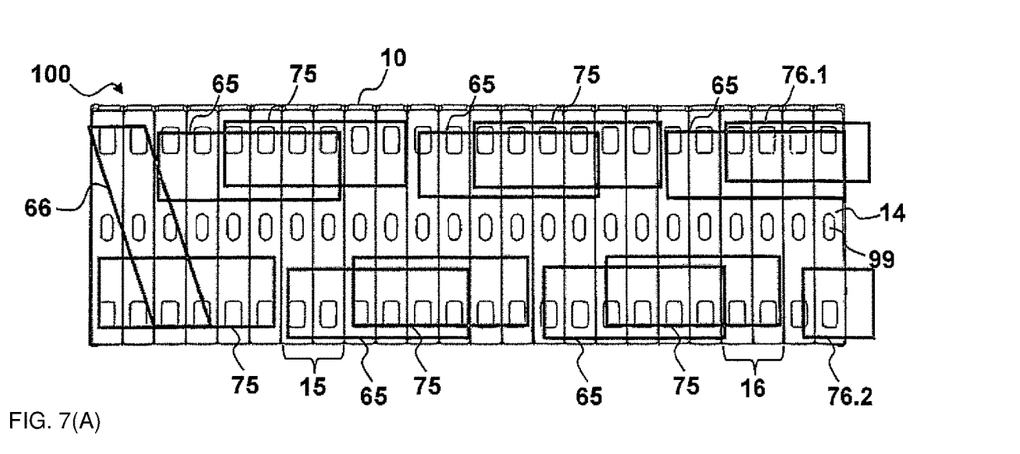
FIGS. 7(A)-7(C) are schematic top views of connection configurations of battery modules according to embodiments.
Figure 7B:
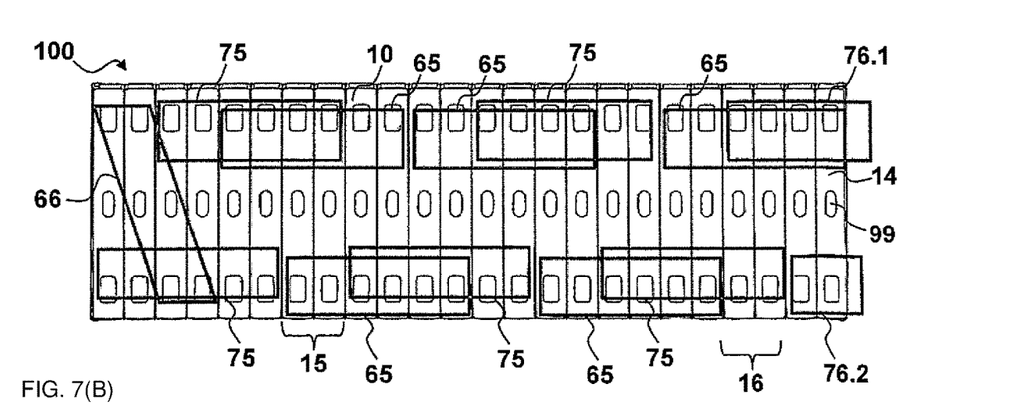

FIG. 7(B) illustrates the current path through the busbars 65, 66, 75, 76 of the battery module 100 shown in FIGS. 3-5, and FIGS. 7(A) and (C) illustrate other example current paths of the battery module 100.

One current path using the busbars 65, 66 of the first set of busbars 60 and the busbars 75, 76 of the second set of busbars 70 is shown in FIG. 7(A). Therein, a third busbar 76.1 of the upper, second set of busbars 70 connects a first module terminal with the upper (e.g., upper with respect to the figure direction) cell terminals of a second pair of battery cells 10 (counted from the right side of the battery module 100). The lower (e.g., lower with respect to the figure direction) cell terminals of this pair of battery cells 10 is connected via a busbar 75 to the lower cell terminals of the next one pair of battery cells 10 (towards the left). In other words, the busbar 75 is not connected to the cell terminals of an adjacent pair of battery cells 10. However, the upper cell terminals of the next one pair of battery cells 10 connected via a busbar 75 are again connected via another busbar 75 to a next one pair of battery cells 10 (to the left), and the lower cell terminals of this pair of battery cells 10 is again connected via another busbar 75 to a next one pair of battery cells 10 (to the left). After two more busbars 75, the lower cell terminals of an outermost pair of battery cells 10 on a left side of the battery module 100 are reached. Therein, the busbars 75 connect a second subset 16 of battery cells 10, which includes (or is is formed by) pairs of battery cells 10 starting from the second pair of battery cells 10 counted from a right side of the battery module 100 to the outermost pair of battery cells 10 at a left side of the battery module 100 and being interleaved with pairs of battery cells 10 of a first subset 15 of battery cells 10 as described below. The upper cell terminals of this leftmost (outermost) pair of battery cells 10 are connected via a third busbar 66 to the lower cell terminals of an adjacent pair of battery cells 10. Therein, the third busbar 66 may provide a transition between the upper second set of busbars 70 to the lower first set of busbars 60. Hence, the third busbar 66 shown in FIG. 7(A) has a bent configuration and extends through any insulating layer disposed between the first and second set of busbars 60, 70. The upper cell terminals of the adjacent pair of battery cells 10 are then connected via a busbar 65 of the first set of busbars 60 to the upper cell terminals of a next one pair of battery cells 10 and so forth until a busbar 65 of the first set of busbars 60 provides a connection to the upper cell terminals of an outermost pair of battery cells 10 on the right end of the battery module 100. Thus, busbars 65 connect a first subset 15 of battery cells 10, which includes (or is formed by) pairs of battery cells 10 starting from the outermost pair of battery cells 10 counted from a right side of the battery module 100 to a second pair of battery cells 10 counted from the left side of the battery module 100. The pairs of battery cells 10 of the first subset 15 of battery cells 10 are interleaved with the pairs of battery cells 10 of the second subset 16 of battery cells 10 as described above. The lower cell terminals of the rightmost (outermost) pair of battery cells 10 are then connected to a second module terminal via a third busbar 76.2 of the second set of busbars 70.

Another example current path through the battery module 100 provided by the busbars 65, 66, 75, 76 is illustrated in FIG. 7(B). Therein, a current path again starts with a third busbar 76.1 of the upper, second set of busbars 70, the third busbar 76.1 connecting a first module terminal with the upper cell terminals of a second pair of battery cells 10 (counted from the right side of the battery module 100). Then, the current path proceeds via three further busbars 75 of the second set of busbars 70 as described with respect to FIG. 7(A). However, while the lower cell terminals of a fifth pair of battery cells 10 counted from the left side of the battery module 100 are connected to a busbar 75, the upper cell terminals of this pair of battery cells is connected to a busbar 65. Hence, a transition between the upper, second set of busbars 70 to the lower, first set of busbars 60 is provided. However, after said busbar 65 connects said cell terminals of said fifth pair of battery cells 10 to the upper cell terminals of a third pair of battery cells 10 counted from the left side of the battery module 100, the lower cell terminals of said third pair of battery cells 10 are again connected via a busbar 75 to the lower cell terminals of the outermost left pair of battery cells 10. The upper cell terminals of this outermost left pair of battery cells 10 are then connected via third busbar 66 to the lower cell terminals of an adjacent pair of battery cells 10. The upper cell terminals of said adjacent pair of battery cells 10 are then again connected via an upper busbar 75 to the terminals of a next one pair of battery cells 10. Hence, solely busbars 75 of the upper second set of busbars 70 surround the third busbar 66 of the lower first set of busbars 60, and hence, electric insulation between these busbars 66, 75 is ensured despite overlap between these busbars.

Figure 7C:
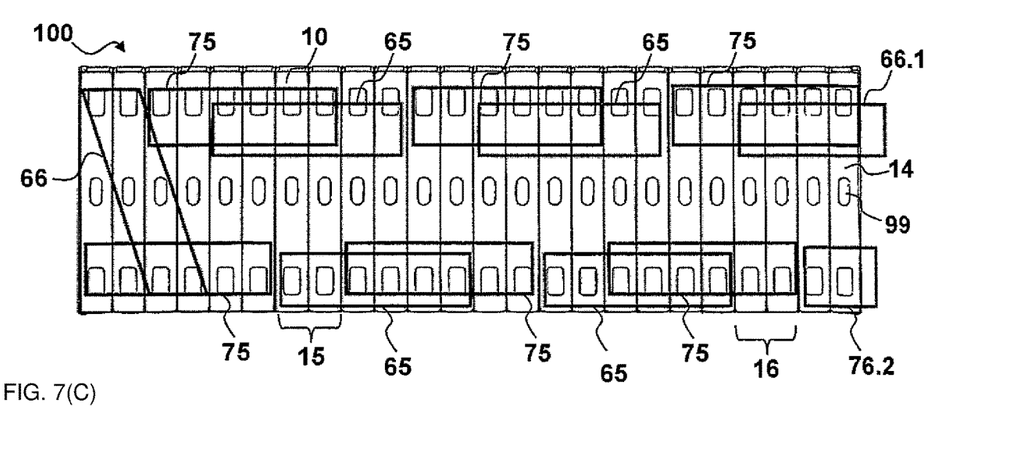

Another example current path through the battery module 100 provided by busbars 65, 66, 75, 76 is illustrated in FIG. 7(C). Therein, and in contrast to the examples shown in FIGS. 7(A) and (B), a third busbar 66.1 of the lower, first set of busbars 60 connects a first module terminal with the upper cell terminals of a second pair of battery cells 10 (counted from the right side of the battery module 100). The lower cell terminals of said second pair of battery cells 10 are then connected via a busbar 75 of the upper, second set of busbars 70 to the lower cell terminals of a next one pair of battery cell 10. The upper cell terminals of said next one pair of battery cells 10 are then again connected via a busbar 65 of said lower first set of busbars 60 and so forth. In other words, each pair of battery cells 10 is connected to one other pair of battery cells 10 via a busbar 65 and to another pair of battery cells 10 via a busbar 75. Thus, a transition between the upper and lower layer of busbars 60, 70 is provided via each pair of battery cells 10. Again in this example, solely busbars 75 of the upper second set of busbars 70 surround the third busbar 66 of the lower first set of busbars 60 connecting the two outermost left pairs of battery cells 10, and hence, electric insulation between these busbars 66, 75 is ensured despite overlap between these busbars 66, 75. However, in the example shown in FIG. 7(C), the lower cell terminals of an outermost right pair of battery cells are connected via a third busbar 76.2 of the upper, second set of busbars 70 to a battery module terminals, and hence, the battery module terminals are provided on different layers of busbars 60, 70.

SOME REFERENCE NUMERALS 10 battery cells
11 positive cell terminal
12 negative cell terminal
13 battery case
14 cap assembly
15 first set of battery cells
16 second set of battery cells
50 busbar
51 busbar body portion
52 cell contact leg
53 cell contact leg
54 first peripheral body section
55 second peripheral body section
56 third central body section
57 first cutout
58 second cutout
60 first (lower) set of busbars
61 busbar body portion
62 cell contact leg
63 cell terminal contact portion
64 bridging portion
65 busbar
66 third busbar
67 inlay
70 second (upper) set of busbars
75 busbar
76 third busbar
77 inlay
80 insulating layers
81 insulating top cover
82 insulating layer
83 insulating layer 84 insulating layer
85 flexible printed circuit (FPC)
86 integrated circuit (IC)
90 battery module (related art)
91 negative module terminal (related art)
92 positive module terminal (related art)
93 busbar (related art)
94 spacer (related art)
95 ribbon (related art)
96 wide module side surface (related art)
97 narrow module side surface (related art)
99 vent opening (related art)
100 battery module

What is claimed is:

1. A busbar for a battery module comprising a plurality of aligned battery cells, the busbar comprising:
    a busbar body portion having a first edge facing a first direction, a second edge facing a second direction opposite to the first direction, and a third edge extending from the first edge to the second edge and facing in a third direction, the busbar body portion extending in an extension direction between the first edge and the second edge;
    a first plurality of legs extending from the first edge of the busbar body portion in the first direction and then extending in the third direction; and
    a second plurality of legs extending from the second edge of the busbar body portion in the second direction and then extending in the third direction,
    wherein a proximal end of the first plurality of legs and the second plurality of legs are at one side of the third edge of the busbar body portion, and a distal end of the first plurality of legs and the second plurality of legs are at an opposite side of the third edge of the busbar body portion,
    wherein the first plurality of legs are configured to electrically connect the busbar body portion to cell terminals of at least two of the battery cells of the battery module, and
    wherein the second plurality of legs are configured to electrically connect the busbar body portion to cell terminals of at least another two of the battery cells of the battery module.

2. The busbar of claim 1, wherein the busbar body portion has a first body section, a second body section, and a third body section, and
    wherein the first body section and the second body section are spaced from each other in the extension direction of the busbar body portion by the third body section.

3. The busbar of claim 2, wherein the first plurality of legs form the first body section, and the second plurality of legs form the second body section.

4. The busbar of claim 2, wherein the first, second, and third body sections have substantially the same length as each other in the extension direction.

5. The busbar of claim 2, wherein ones of the legs in the first plurality of legs are separated from each other by a first cutout that extends into the first body section, and
    wherein ones of the legs in the second plurality of legs are separated from each other by a second cutout that extends into the second body section.

6. The busbar of claim 1, wherein a height of the busbar is smaller than a width and a length of the busbar.

7. The busbar of claim 6, wherein a height of the busbar body portion is smaller than a width and a length of the busbar body portion.

8. A battery module comprising:
    at least four battery cells aligned in a lengthwise direction, each of the at least four battery cells comprising a battery case, a cap assembly on the battery case, and a plurality of cell terminals; and
    the busbar according to claim 1,
        wherein a first one of the first plurality of legs electrically connects the busbar body portion and one of the cell terminals of a first one of the at least four battery cells to each other, a first one of the second plurality of legs electrically connects the busbar body portion and one of the cell terminals of a fourth one of the at least four battery cells to each other, and
        wherein the busbar body portion extends over a second one of the at least four battery cells and a third one of the at least four of battery cells in the lengthwise direction, the second one and the third one of the at least four battery cells being between the first one and the fourth one of the at least four battery cells in the lengthwise direction.

9. The battery module of claim 8, wherein the busbar body portion has a first body section, a second body section, and a third body section,
    wherein the first body section and the second body section are spaced from each other in the lengthwise direction by the third body section, and
    wherein at least one of the first, second, and third body sections has a length in the lengthwise direction of the battery module that is equal to or greater than a length of one of the battery cells in the lengthwise direction of the battery module.

10. A battery module comprising:
    first, second, third, and fourth battery cells sequentially arranged in a lengthwise direction, each of the battery cells comprising a battery case and a cap assembly on the battery case;
    a first busbar according to claim 1 and a second busbar according to claim 1; and
    an electrically insulating layer separating the first busbar and the second busbar from each other,
        wherein the first busbar overlaps the second busbar with the electrically insulating layer therebetween,
        wherein the second busbar is connected to the first battery cell and the fourth battery cell, and
        wherein the first busbar is connected to the second battery cell and the third battery cell.

11. The battery module of claim 10, wherein the first busbar interconnects a first subset of the battery cells, and
    wherein the second busbar interconnects a second subset of the battery cells.

12. The battery module of claim 10, wherein a length of the busbar body portion in the lengthwise direction corresponds to a length of at least one of the battery cells in the lengthwise direction connected in parallel to another one of the battery cells.

13. The battery module of claim 10, wherein another electrically insulating layer is below the first busbar.

14. The battery module of claim 10, wherein another electrically insulating layer is above the second busbar.

15. The battery module of claim 10, wherein the electrically insulating layer comprises a flexible printed circuit comprising outer insulating layers.

16. The battery module of claim 10, wherein the busbar body portion of the first busbar is arranged spatially between a cap assembly of a corresponding one of the battery cells and an upper surface of one of the cell terminals of the corresponding one of the battery cells, wherein one of the first or second plurality of legs of the first busbar has cell terminal contact portions spaced from the busbar body portion in a height direction of the first busbar and has a bridging portion connecting the busbar body portion and the cell terminal contact portions to each other, and wherein the second busbar has a planar shape and a height equal to or less than a height of a cell terminal of the corresponding one of the battery cells.

\* \* \* \* \*